United States Patent [19]

Boateng et al.

[11] Patent Number: 4,915,919

[45] Date of Patent: Apr. 10, 1990

[54] RECOVERY OF GERMANIUM FROM AQUEOUS SOLUTIONS BY SOLVENT EXTRACTION

[75] Inventors: Daniel A. D. Boateng, Montrose; David A. Neudorf, Val Thereses; Victor N. Saleh, Trail, all of Canada

[73] Assignee: Cominco Ltd., Vancouver, Canada

[21] Appl. No.: 237,742

[22] Filed: Aug. 29, 1988

[30] Foreign Application Priority Data

Sep. 29, 1987 [CA] Canada .................................. 548084
Aug. 26, 1988 [CA] Canada .................................. 575886

[51] Int. Cl.$^4$ .............................................. C01G 17/00
[52] U.S. Cl. .................................. 423/89; 252/182.12; 252/182.3; 252/364; 423/24; 423/87; 423/99; 423/112; 423/139
[58] Field of Search ..................... 423/89, 24, 87, 99, 423/112, 139

[56] References Cited

U.S. PATENT DOCUMENTS

| | | | |
|---|---|---|---|
| 3,760,060 | 9/1973 | Morgan | 423/89 |
| 3,764,652 | 10/1973 | Morgan | 423/89 |
| 3,883,634 | 5/1975 | De Schepper et al. | 423/89 |
| 4,088,733 | 5/1978 | De Schepper et al. | 423/544 |
| 4,432,952 | 2/1984 | De Schepper et al. | 423/89 |
| 4,587,106 | 5/1986 | Bauer et al. | 423/89 |

FOREIGN PATENT DOCUMENTS

| | | | |
|---|---|---|---|
| 1179145 | 12/1984 | Canada . | |
| 3508041 | 9/1986 | Fed. Rep. of Germany | 423/89 |
| 31048 | 2/1983 | Japan | 423/89 |

OTHER PUBLICATIONS

G. Cote & D. Bauer: Liquid–Liquid Extraction of Germanium with Oxine Derivatives, Hydrometallurgy, 5, 149–160 (1980).

Tian, Runcang; Zou, Jiayan; Zhou, Lingzhi: New Technology for Indium, Germanium and Gallium Recovery in an Electrolytic Zinc Plant, Miner. Process, Extr. Metall., Pap. Int. Conf., 1984, 615–24.

*Primary Examiner*—Robert L. Stoll
*Assistant Examiner*—Wayne A. Langel
*Attorney, Agent, or Firm*—Wenderoth, Lind & Ponack

[57] ABSTRACT

An improved method for selectively rcovering Ge from acidic solution containing Ge and typically Zn, As, Cd, Sb, In, Cu and Fe (II) by multistage, countercurrent liquid-liquid extraction is described. The extractant used in the organic phase is an oxime, for example, 5,8-diethyl-7-hydroxy-6-dodecanone oxime, mixed with at least one alkylphosphoric acid, for example either di-2-ethylhexyl phosphate alone or admixed with mono-2-ethylhexyl phosphate, dissolved in a hydrocarbon diluent. This mixed system shows better efficiency and selectivity for germanium than known systems using either oximes or alkylphosphoric acids separately.

8 Claims, No Drawings

RECOVERY OF GERMANIUM FROM AQUEOUS SOLUTIONS BY SOLVENT EXTRACTION

The possibility of using oximes, alkylphosphoric acids and oxines in solvent extraction processes for a range of metals has been the subject of much study. Typical references concerning work on germanium extraction are as follows:

U.S. Pat. No. 3,760,060 (1973 Morgan) and U.S. Pat. No. 3,764,652 (1973, Morgan) disclose germanium extraction from alum solutions. The organic phase used contained a mixture of substituted phosphoric acids. The preferred extractant was mono-2-ethylhexylphosphoric acid. Di-2-ethylhexylphosphoric acid was found to be ineffective. The organic phase contained about 20 weight % mono-2-ethylhexylphosphoric acid. The feed solution had a free sulphuric acid concentration of 0.05 to 0.60 molar, corresponding to about 5 to 60 g/L $H_2SO_4$.

U.S. Pat. No. 3,883,634 (1975, DeSchepper, et al) discloses extraction of germanium from acid solutions using hydroxyoximes. The preferred extractant is one described as LIX 63* which is stated to contain as active ingredient, in a hydrocarbon diluent, the compound 19-hydroxyhexatriaconta-9,28-diene-18-oxime (later references, for example U.S. Pat. No. 4,432,952 discussed below, indicate this naming to be in error; the active oxime in LIX 63 is 5,8-diethyl-7-hydroxy-6-dodecanone oxime. It is not known how this error came to be made in this patent). The germanium extraction capacity increases with the acidity of the feed solution. In the examples quoted, the acidity ranges from 130 to 460 g/L $H_2SO_4$. No information is given on the co-extraction of cadmium, antimony or indium.
* Trade Mark of Henkel Corporation U.S. Pat. No. 4,389,379 (1983, Rouillard, et al) discloses selective extraction of germanium from acidic solutions, containing zinc and other species, with oxine derivatives, the one known commercially as Kelex 100** being preferred. In the only example given which demonstrates selective germanium extraction in the presence of zinc, the acidity is quite high, at 150 g/L $H_2SO_4$. A disadvantage of the process claimed in this patent is that the temperature of the stripping stage must be relatively high, at least 40° C. Another disadvantge is that the rate of disengagement, of the aqueous and organic phaes, is inherently slow.
** Trade Mark of Sherex Chemical Company U.S. Pat. No. 4,432,951 (1984, DeSchepper, et al) discloses germanium extraction from acid solutions carried out at temperatures above 40° C. with substitued oxines, such as Kelex 100 or LIX 26*.
* Trade Mark of Henkel Corporation U.S. Pat. No. 4,432,952 (1984, DeSchepper, et al) discloses germanium extraction at low acidity with a mixture of an alpha-hydroxyoxime (e.g. LIX 63, identified correctly as 5,8-diethyl-7-hydroxy-6-dodecanone oxime) and a substituted 8-hydroxyquinolie (e.g. Kelex 100 or LIX 26). This patent clearly states that the aqueous feed solution must be almost free of copper, otherwise the alpha-hydroxyoxime becomes poisoned. No information is given on co-extraction of zinc, cadmium, antimony, or indium.

U.S. Pat. No. 4,568,526 (1986, Rouillard, et al), a continuation of U.S. Pat. No. 4,389,379, discloses germanium extraction by means of an organic solid medium containing an oxine derivative.

U.S. Pat. No. 4,666,686 (1987, Krajewski, et al) discloses extraction of gallium, germanium or indium from basic or acidic solution with an organic phase containing at least Kelex 100 and LIX 26. The organic phase may also contain tri-n-octylphosphine oxide.

A. DeSchepper, in "Liquid-Liquid Extraction of Germanium by LIX 63" Hydrometallurgy, Vol. 1, 291-298 (1976) describes the extraction of germanium with LIX 63 in the presence of various impurities. No information is given on the impurities cadmium, antimony or indium. In a second paper, "Liquid-Liquid Extraction of Germanium by LIX 63" Chloride Hydrometall. Proc. (Int. Symp.) 1977, 357-367, the same author describes germanium extraction with LIX 63. No information is given on the behaviour of cadmium, antimony or indium. These papers contain much the same data as U.S. Pat. Nos. 3,883,634 and 4,432,952, above.

G. Cote and D. Bauer, in "Liquid-Liquid Extraction of Germanium with Oxine Derivatives" Hydrometallurgy, 5, 149-160, (1980), describe a survey of ten germanium extractants. Of those surveyed, oxine derivatives were found to be among the most efficient. Di-2-ethyl hexylphosphoric acid was found to be a poor extractant for germanium, as it only shows an acceptable level of efficiency if the aqueous phase is extremely acidic. Extrapolation of the data in FIG. 1 indicates that an aqueous phase acidity in the range of about 500 to 700 gm/liter is required.

R. Tian, et al, in "New Technology for Indium, Germanium and Gallium Recovery in an Electrolytic Zinc Plant", Miner. Proc. Extr. Metall., Pap. Int. Conf. 1984, 615-624, describe extraction of germanium with a mixture of di-2-ethylhexylphosphoric acid and YW 100. The latter extractant is not chemically identified. A search of the Chemical Abstracts Service database using the Registry No. [94336-45-5] for YW 100 disclosed no other references to this extractant. These authors also indicate that di-2-ethylhexylphosphoric acid alone does not apparently extract germanium from an aqueous acid phase containing from about 3 to about 17 gm/liter sulphuric acid.

This invention is directed to a method for the recovery of germanium and, more particularly, is directed to a method for the selective recovery of germanium from acidic aqueous solutions by countercurrent liquid-liquid extraction, using an organic phase.

Germanium may be present in intermediate products obtained in the processing of ores and metal concentrates. A typical source of such intermediate products is in the processing of zinc sulphide ores to obtain zinc metal by the electrolysis route. Such intermediate products can be in the form of germanium-containing solutions or solid residues. The latter may be solubilized to give germanium-containing solutions. The germanium-containing solutions usually contain one or more of a large number of other metals.

Although the invention will be described with specific reference to solutions obtained from the sulphuric acid leaching of zinc-bearing intermediate products, it is understood that the method of the invention is also suitable for the recovery of germanium from other germanium-containing solutions.

According to the invention, germanium is substantially separated from the other metal constituents in an aqueous feed solution which may also contain significant amounts of any of the following: sulphuric acid, zinc, arsenic, cadmium, antimony, indium, copper and iron (ferrous) in addition to germanium. Thus the method of this invention is suitable for the efficient extraction of germanium from acid solutions containing the following ranges of metallic species concentrations, expressed in g/L:

| Ge 0.005–5 | Sb 0.01–1 |
|---|---|
| Zn 0.5–160 | In 0.01–2 |
| As 0.005–4 | Cu 0.001–0.1 |
| Cd 0.005–5 | Fe 0.01–50 (as ferrous) |

Briefly, this invention utilizes the following steps:

(1) Contacting the aqueous feed solution in an extraction step with an organic phase containing an extractant;

(2) Separating the loaded organic phase containing the major portion of the germanium from the aqueous extraction raffinate which is substantially depleted in germanium;

(3) Contacting the loaded organic phase in a scrubbing step with a scrub solution containing a mineral acid, such as sulphuric acid, to remove co-extracted indium from the loaded organic;

(4) Separating the scrubbed organic phase, containing substantially all of the germanium, from the scrub raffinate;

(5) Contacting the scrubbed organic phase in a stripping step with an aqueous alkaline solution to transfer substantially all of the germanium into the strip liquor;

(6) Separating the stripped organic phase from the strip liquor which contains substantially all of the extracted germanium;

(7) Contacting the stripped organic phase with an acidic regenerant solution to restore the organic phase to its original condition;

(8) Recycling the regenerated organic phase to the extraction step; and (9) Treating the strip liquor to recover a germanium product.

Each of the mixed phase contacting steps (i.e., steps (1), (3), (5) and (7)) may comprise several stages connected in series, with countercurrent flow of the aqueous and organic phases in each stage.

This extraction system is thus seen to follow, in its broad outlines, essentially conventional practice. This invention is primarily concerned with one of the most important features of this system, namely the composition of the organic extractant phase.

We have now found that an efficient separation of germanium, from an aqueous solution containing germanium and other metal elements including at least one of zince, arsenic, cadmium, antimony, indium, copper and ferrous iron, and which also may contain sulphuric acid, can be achieved by a multistage counter-current liquid-liquid extraction system wherein the organic phase comprises a solution of an alpha-hydroxyoxime and at least one alkylphosphoric acid in a hydrocarbon diluent.

Thus in a first broad aspect, this invention provides a method for the separation of germanium, from an aqueous acid containing feed solution containing germanium and other dissolved metal elements including at least one metal chosen from the group consisting of zince, arseic, cadmium, antimony, indium, copper, and ferrous iron, which method utilizes multistage coutnercurrent liquid-liquid extraction, the improvement comprising using as the organic phae a solution of an alpha-hydroxy oxime together with at least one alkylphosphoric acid in a hydrocarbon diluent.

In a second broad aspect, this invention provides in a process for the separation of germanium from an aqueous sulphuric acid containing feed solution containing germanium and other dissolved metal elements including at least one metal chosen from the group consisting of zince, arsenic, cadmium, antimony, indium, copper, and ferrous iron, which process utilizes multistage countercurrent liquid-liquid extraction, the improvement comprising using as the organic phase a solution in a hydrocarbon diluent of 5,8-diethyl-7-hydroxy-6-dodecanone oxime together with a phosphoric acid chosen from either di-2-ethylhexylphosphoric acid or a mixture of mono- and di-2-ethylhexylphosphoric acids.

In a third more detailed aspect, this invention provides an organic phase for use in a multistage countercurrent liquid-liquid extraction process for the separation of germanium from an aqueous acid solution containing germanium and at least one metal selected from the group consisting of zince, arsenic, cadmium, antimony, indium, copper and ferrous iron comprising a solution in a hydrocarbon diluent of 5,8-diethyl-7-hydroxy-6-dodecanone oxime together with a phosphoric acid chosen from either di-2-ethylhexylphosphoric acid, or a mixture of mono-2-ethylhexylphosphoric acid and di-2-ethylhexylphosphoric acid.

To this organic phase may also be added, if desired, conventional additives to suppress foam formation and to suppress emulsion formation, thus aiding phase separation.

Preferably, the alpha-hydroxyoxime is 5,8-diethyl-7-hydroxy-6-dodecanone oxime, which is available commercially under the designation "LIX 63" as a 70% by volume solution in a hydrocarbon diluent.

The preferred alkylphosphoric acid is a 2-ethylhexylphosphoric acid. It is preferred to use di-2-ethylhexylphosphoric acid (D2EHPA), or, more preferably, a mixture of D2EHPA and mono-2-ethylhexylphosphoric acid (M2EHPA).

There are some surprising and unexpected benefits to be gained in the use of this invention.

A high acid concentration is not required in the aqueous feed solution. The aqueous feed may contain 50 to 150 g/L $H_2SO_4$, and although a higher acid concentration will not be harmful, it is not necessary. Alpha-hydroxyoximes alone are known extractants for germanium, as disclosed in U.S. Pat. No. 3,883,634. The acid concentrations in the examples quoted in this patent are high, ranging from 130 to 460 g/L. It is known that LIX 63 is an effective extractant for germanium only at higher acidities (greater than 90 g/L $H_2SO_4$). When LIX 63 alone is used for germanium extraction, a significant amount of acid is co-extracted along with the germanium, and the acid co-extraction increases with increasing acid concentration in the aqueous feed solution. The co-extracted acid may be partially removed by scrubbing the organic phase with water prior to stripping. If water scrubbing is not implemented, the extracted acid remains in the organic phae until the stripping stage is reached, where the acid is neutralized and the germanium is stripped with alkaline strip solution. This results in both a relatively low germanium concentration in the strip liquor, and a high consumption of alkaline strip solution, which increases process operating costs.

With the process of this invention, it has surprisingly been found that addition of a relatively minor proportion of D2EHPA to LIX 63 gives improved germanium extraction, even with a comparatively low acid concentration in the aqueous feed. This finding is especially interesting in view of the fact that D2EHPA by itself is known to be a poor extractant for germanium at low acidities, and only becomes efficient when the concentration of sulphuric acid in the feed solution exceeds several hundred grams per litre. It was moreover found that addition of a relatively small proportion of M2EHPA, a known Germanium extractant, to a mixture of LIX 63 and D2EHPA enhanced Germanium extraction still further under relatively low-acid conditions. The result is efficient Germanium extraction with not only a substantially lower co-extraction of acid but also a much lower cost for extraction raffinate disposal.

Since relatively little acid is co-extracted in the present invention, the need to scrub the loaded organic phase with water to remove acid is eliminated. Also, alkali wastage as, for example, sodium sulphate, in the stripping stage is minimized. Further, a higher germanium concentration is obtained in the strip liquor, which in turn greatly facilitates efficient recovery of a germanium product.

Another unanticipated feature of this invention is related to the fact that alkyl esters of phosphoric acid are known to extract both zinc and indium from acidic aqueous phases. It was surprisingly found that zinc co-extraction is apparently completely suppressed, and the indium co-extraction is largely suppressed, when an alpha-hydroxyoxime is used in combintion with alkyl esters of phosphoric acid.

Additionally, it is reported in the prior art that the efficient extraction of germanium with alpha-hydroxyoximes alone requires a high extractant concentration in the organic phase, i.e. 70 to 100%. In the case of LIX 63, 100% means that the LIX 63 is used as purchased from the organic phase. It is also reported in the prior art that extraction of Germanium with M2EHPA alone required a M2EHPA concentration of 20 weight % in the organic phase. In contrast, efficient germanium extraction is obtained in the present invention with considerably lower extractant concentrations, which can be as low as only about 5 volume % of LIX 63, in the presence of only about 3 volume % of combined D2EHPA and M2EHPA. This leads to a favourable reduction both in extractant inventory, and in organic phase viscosity. Low viscosity enhances extraction kinetics, aids phase separation and reduces settler area requirements. A further benefit of lower extractant concentrations in the organic phase is less conversion of the oxime and alkyl esters of phosphoric acid to their corresponding alkali metal salt forms during the alkaline stripping step. The advantages of this are lower alkali consumption during stripping, less dilution of the germanium content in the strip liquor, lower acid requirement in regenerating the solvent and less production of waste sulphate salt during both stripping and regeneration.

Finally, it also appears that phase separation using an organic phase containing LIX 63 in the presence of the alkyl esters of phosphoric acid is faster than in their absence. The reasons for this are unknown.

Some detailed consideration will now be given to the process steps noted above.

Process steps (1) through (8) may be carried out at any convenient temperature in the range of from 0° C. (freezing, obviously, needs to be avoided) up to about 55° C. Unlike some of the reported procedures for germanium recovery, elevated temperatures are not necessary, and a preferred temperature range is 20°–40° C.; in other words, the system can be allowed to reach its own thermal balance essentially in a "room temperature" environment.

As regards apparatus, conventional mixer-settler units of an appropriate size are suitable, for each of the mixed phase contacting steps (i.e. steps (1), (3) (5) and (7)).

In step (1), extraction is carried out using an organic phase containing either a combination of LIX 63 and D2EHPA or a combination of LIX 63, D2EHPA and M2EHPA. The latter combination is preferred.

For extraction with combined LIX 63 and D2EHPA, the volume ratio of LIX 63 to D2EHPA used in the organic phase will range from about 2:1 to about 10:1 with a preferred range from about 4:1 to about 6:1. As LIX 63 contains 70% oxime by volume, the volume ratio of oxime to D2EHPA will thus range from about 7:5 to about 7:1, with a preferred range from about 14:5 to about 17:4. Typically, the organic phase contains from about 20 to about 30 volume % LIX 63 (about 14 to about 21 volume % oxime) and from about 3 to about 10 volume % D2EHPA. Preferably, the organic phase contains from about 20 to about 25 volume % LIX 63 (about 14 to about 17 volume % oxime) and from about 4 to about 5 volume % D2EHPA. The remainder of the organic phase is hydrocarbon diluent and modifier (if required). An organic to aqueous volume ratio of about 1/1 is suitable for the extraction step.

For extraction with combined LIX 63, D2EHPA and M2EHPA, the volume ratio of LIX 63 to total ethylhexyl phosphates will range from about 1:1 to about 10:1, with a preferred range from about 2:1 to about 6:1. The volume ratio of D2EHPA to M2EHPA will range from about 2:3 to about 7:4. In terms of oxime, the volume ratio of oxime to total phosphates will thus range from about 7:10 to about 7:1, with a preferred range from about 7:5 to about 17:4. The organic phase may contain from about 5 to about 30 volume % LIX 63 (about 3 to about 21 volume % oxime), from about 1 to about 10 volume % D2EHPA and from about 1 to about 12 volume % M2EHPA. Preferably, the organic phase will contain from about 15 to about 25 volume % LIX 63 (about 10 to about 17 volume % oxime) and about 4 to about 8 volume % total phosphates, with the volume ratio of D2EHPA to M2EHPA being in the range from about 2:3 to about 7:4. The remainder of the organic phase is hydrocarbon diluent. An organic to aqueous volume ratio as low as 1/3 is satisfactory in the extraction step.

The practical upper limit on the amount of LIX 63 that can be used in the organic phase appears to be of the order of 30 volume %. If the amount of LIX 63 is too high, then the organic phase whilst retaining its activity as an extractant will become too viscous to be of practical utility. As previously noted, LIX 63, as purchased, is a 70% solution of oxime in hydrocarbon. The LIX 63 thus contributes to the total amunt of hydrocarbon in the organic phase. The hydrocarbon present in LIX 63 as purchased is alleged to be about 11% aromatic and about 49% paraffinic, with about 40% naphthenes.

For extraction with combined LIX 63 and D2EHPA, suitable diluents include kerosene, aliphatic hydrocarbons (e.g., Isopar M*) and aromatic hydrocarbons (e.g., Solvesso 100*). With kerosene diluent, in the absence of modifiers, stable emulsions form during extraction when the organic phase is conditioned by methods C-1 or C-2, (see below for explanation of conditioning methods), or with dilute sulphuric acid (150 g/L $H_2SO_4$). Acceptable rates of phase separation can be achieved with kerosene without using a modifier if the organic phase is conditioned by methods C-3 or C-4. Without conditioning, satisfactory phase separation with kerosene can be obtained by addition of long-chain alkanol modifiers, for example, 5 to 20 volume % of either 1-decanol or 2-ethylhexanol. The formation of stable emulsions with unconditioned organic phase using kerosene diluent cannot be prevented by addition of dibutyl-butylphosphonate or tributylphosphate. With Isopar M diluent and conditioning methods C-1, C-2 or C-4, addition of alkanol modifiers, for example, 5 to 20 volume % of either 1-decanol or 2-ethylhexanol, prevents formation of stable emulsions. With Solvesso 100 diluent and conditioning method C-2, an acceptable rate of phase separation is achieved without using a modifier. The efficiency of germanium extraction is influenced by the nature of the diluent, the addition of modifiers and by the method used to condition the organic phase. For extraction with combined LIX 63 and D2EHPA, the preferred diluent is a substantially aliphatic hydrocarbon, such as Isopar M, with an alkanol modifier, 1-decanol being preferred. The preferred concentration of 1-decanol in the organic phase is about 10 volume %. Less preferably, a substantially aromatic hydrocarbon diluent, such as Solvesso 100, may be used without a modifier. The preferred conditioning method is either C-1 or C-2.

\* Trade Mark of Exxon Chemical

For extraction with combined LIX 63, D2EHPA and M2EHPA, hydrocarbon diluents such as Exxsol D 80\*, kerosene, Isopar M and Solvesso 100 have been found to be suitable. Exxsol D 80 is preferred because of its relatively high flash point. No modifier is required provided the organic phase is suitably conditioned prior to use. Rapid phase separation is obtained when the organic phase is conditioned by methods C-1, C-2 or C-3. There is no significant difference in Ge extraction efficiency with these three conditioning methods. It is preferred to use conditioning methods C-1 or C-2 with no modifier.

\* Trade Mark of Exxon Chemical

In step (3), scrubbing, a mineral acid is used as the scrub solution, to remove co-extracted Indium from the loaded organic phase. It is convenient to use the same acid as is present in the aqueous feed solution. As this is often a sulphuric acid solution, for example in an electrolytic recovery plant, it is convenient to use sulphuric acid in this step. Conveniently when using sulphuric acid the concentration is from 50 to 300 g/L, with a preferred range at 100 to 200 g/L. The presence of zince sulphate in the scrub solution, for example at 30 to 70 g/L zince, also can be tolerated. Organic to aqueous volume ratios in the range 1/1 to 5/1 are suitable.

The alkaline strip solution for the Germanium stripping step (5) is preferably a sodium hydroxide solution containing 20 to 250 g/L NaOH. The optimum concentration range is 120 to 200 g/L NaOH. A similar potassium hydroxide solution may also be used for stripping. Organic to aqueous volume ratios from 2/1 to 5/1 have been found to be satisfactory.

Regeneration of the organic phase in step (7) is effected by contacting the stripped organic phase with an acidic regenerant solution. The regenerant solution should contain 50 to 250 g/L $H_2SO_4$, preferably 100 to 200 g/L. It may also contain a salt such as zinc sulphate or sodium sulphate. The preferred salt is zinc sulphate, to provide a Zn concentration in the regenerant solution of 40 to 100 g/L. The organic to aqueous volume ratio suitably is in the range from 1/1 to 5/1.

A germanium product may be obtained from the strip liquor (Step (9)) by known means. For example, the strip liquor may be neutralized with acid to precipitate solids which contain the germanium. These solids may then be filtered off, dried, and sold as germanium concentrate, or they may be dissolved in hydrochloric acid to produce a solution from which $GeCl_4$ may be distalled, with the impurities remaining in the distillation residue. It is desirable for arsenic to be absent because of the difficulty in separating arsenic and germanium chlorides by distillation. Using the method of this invention, the amount of As in the strip liquor is insignificant. $GeCl_4$ may be converted to electronic-grade elemental Germanium by known methods.

In the Examples, which are set forth below, several different methods of conditioning the fresh organic phase were used. In each case, the organic phase was contacted with the indicated acidic solution(s) for about 15 minutes, and then separated therefrom prior to use in extraction. The four most frequently used methods were:

C-1 Treatment with solution containing 130 g/L $H_2SO_4$ and 140 g/L $Na_2SO_4$.

C-2 Treatment with "return acid". So-called "return acid" is the solution remaining after electrowining zinc from a zince sulphate solution. Return acid contains about 130 g/L $H_2SO_4$ and about 30 g/L Zn, present as $ZnSO_4$, plus a range of other elements in varying amounts.

C-3 Two-stage treatment, the first stage consisting of treatment with "neutral" zince sulphate electrolyte sollution containing about 130 g/L Zn and having a pH of about 4.8, and the second stage consisting of treatment with return acid.

C-4 Treatment with aqueous feed solution of specified composition.

The main purpose of conditioning was to pre-load the organic phase with acid, to help ensure equilibration of the aqueous and organic phases during extraction. Another benefit of conditioning is that it may remove undesired water-soluble impurities from the organic phase. As described previously, conditioning also had an impact on phase separation. In general it was found that conditioning methods employing solutions having a high ionic strength gave higher phase disengagement rates. Conditioning methods C-1 and C-2 are preferred because the solutions used would be appropriate regenerant solutions in the regeneration step prior to extraction in a continuous process for germanium recovery from a sulphate-based zinc hydrometallurgical circuit.

LIX 63 was obtained from Henkel Corporation. One lot of LIX 63 was found to be contaminated with a small amount of aromatic compounds, such as benzophenone oxime. This lot gave slower Germanium extraction rates than pure lots. Uncontaminated LIX 63 was used in the Examples, except for Examples 1, 3 and 5, when the impure material was used.

The 2-ethylhexylphosphoric acid esters used in the Examples were obtained from several sources. Commercial grade D2EHPA was obtained as a 97–98% pure liquid from Albright & Wilson, Ltd., and from AZS Corporation. The mon-ester M2EHPA is not available commercially in a pure state. It is always admixed with at least some di-ester, D2EHPA, and sometimes even with the tri-ester in small amounts. the M2EHPA used was obtained from Albright & Wilson, Ltd., Hodag Chemical Corporation, Stauffer Chemical Company and Pfaltz & Bauer, Inc., under names such as "OAP" (octyl acid phosphate), or "EHAP" (ethyl hexyl acid phosphate). As supplied, the composition of the material varied from lot to lot. The material used in these Examples contained from about 36% to about 60% by volume of M2EHPA, with the balance comprised substantially of D2EHPA. The fact that M2EHPA is a mixture with D2EHPA is allowed for in the Examples when amounts of M2EHPA and D2EHPA are given.

Kerosene, designated No. 3Cl-101-47, containing paraffins, naphthenes and about 15% aromatic hydrocarbons (obtained from Shell Chemical Co.) was used in the Examples unless otherwise indicated. Isopar M, a diluent containing at least 99% aliphatic hydrocarbons, and Solvesso 100, a diluent containing at least 98% aromatic hydrocarbons, were obtained from Exxon Chemical and Imperial Oil, Ltd., respectively. Exxsol D 80, diluent containing 63% naphthenes, 36% paraffins and less than 1% aromatics, was obtained from Esso Chemical Canada.

1-Decanol was obtained from Exxon Chemical and C-I-L Inc. 2-Ethylhexanol was obtained from Fisher Scientific Co. Dibutylbutylphosphonate and tributylphosphate were obtained from Albright & Wilson, Ltd.

Reagent-grade NaOH and $Na_2SO_4$ were used. Reagent-grade $H_2SO_4$ was used except where otherwise indicated.

Unless otherwise indicated, the tests described in the following Examples were conducted at room temperature.

EXAMPLE 1

Extraction of Ge with LIX 63 Alone

An organic phase consisting of, by volume, 25% LIX 63 and 75% kerosene, was conditioned by method C-1. The LIX 63 contained aromatic impurities. A portion of aqueous feed solution containing 0.63 g/L Ge and 75 g/L $H_2SO_4$ was contacted for 18 minutes in a mixer unit with the conditioned organic phase at an organic phase to aqueous phase volume ratio of 1/1. After phase separation, the aqueous extraction raffinate was analyzed and found to contain 0.34 g/L Ge. The organic phase was calculated to contain 0.29 g/L Ge, corresponding to 46% Ge extraction. Example 1 shows that LIX 63 by itself is comparatively inefficient in extracting Ge from solutions having relatively low acid concentrations, as expected.

EXAMPLE 2

Extraction of Ge with D2EHPA Alone

An organic phase consisting of, by volume, 5% D2EHPA and 95% kerosene, was conditioned by method C-1. A portion of aqueous feed solution containing 0.63 g/L Ge and 75 g/L $H_2SO_4$ was contacted for 18 minutes in a mixer unit with the conditioned solvent at a phase volume ratio of 1/1. Upon analysis of the aqueous extraction raffinate, it was found that no Ge has been extracted.

Example 2 demonstrates that an organic phase containing D2EHPA by itself is ineffective for extracting Ge from sulphate solution containing a relatively low $H_2SO_4$ concentration, in accordance with the teaching of U.S. Pat. Nos. 3,760,060 and 3,764,652.

EXAMPLE 3

Extraction of Ge with Combined LIX 63 and D2EHPA

A series of tests was carried out using organic phases containing both LIX 63 and D2EHPA as combined extractants, together with various diluents, modifiers and solvent conditioning methods. The LIX 63 contained aromatic impurities. The results are shown in Table 1. In each test, aqueous feed solution containing 0.66 g/L Ge and 75 g/L $H_2SO_4$ was contacted for 18 minutes in a mixer unit with conditioned organic phase at a phase volume ratio of 1/1. Organic phase composition is expressed in volume %.

TABLE 1

| Test No. | Organic Phase | | | | Cond. Method | Ge Extr'n |
| | LIX 63 | D2EHPA | Diluent | Modifier | | |
| --- | --- | --- | --- | --- | --- | --- |
| 3(a) | 25% | 5% | kerosene 70% | nil | C-4 | 56% |
| 3(b) | 25% | 5% | kerosene 70% | nil | C-3 | 60% |
| 3(c) | 20% | 4% | Isopar M 56% | 2-ethyl-hexanol 20% | C-2 | 67% |
| 3(d) | 25% | 5% | Isopar M 60% | 1-decanol 10% | C-4 | 74% |
| 3(e) | 25% | 5% | Solvesso 100 70% | nil | C-2 | 83% |
| 3(f) | 25% | 5% | Isopar M 60% | 1-decanol 10% | C-1 | 89% |

This Example shows that an organic phase containing a combination of LIX 63 and D2EHPA gives better Ge extraction than LIX 63 alone, although D2EHPA by itself does not extract Ge under the test conditions used, as is shown above in Example 2. Example 3 also indicates that Ge extraction efficiency with combined LIX 63 and D2EHPA is influenced by the nature of the hydrocarbon diluent, by the addition of modifiers, and by the method used to condition the organic phase. Higher Ge extraction was obtained with the diluents Isopar M (substantially aliphatic) and Solvesso 100 (substantially aromatic) than with kerosene. A satisfactory rate of phase disengagement was observed in all the tests listed in Table 1. With kerosene or Solvesso 100, adequate phase separation was attained without addition of a modifier, provided the organic phase was properly conditioned prior to extraction. Conditioning methods C-3 and C-4 were suitable for kerosene, and method C-2 was suitable for Solvesso 100. With Isopar M, using conditioning methods C-1, C-2 or C-4, addition of a modifier was necessary to prevent stable emulsions. The alkanol modifiers 1-decanol and 2-ethylhexanol both proved satisfactory. Comparisons of Test 3(a) with 3(b) and 3(d) with 3(f) indicate that the conditioning method has an effect on the efficiency of Germanium extraction. With kerosene diluent, C-3 appears preferable to C-4. With Isopar M diluent in the presence of 10 volume % 1-decanol, C-1 appears preferable to C-4. The highest Ge extraction efficiency was obtained with Isopar M diluent in the presence of 10 volume % 1-decanol. Solvesso 100 with no modifier was next best. It is believed that the relative ranking of the results shown in Table 1 was not substantially affected by the presence of small amounts of aromatic impurities in the LIX 63.

EXAMPLE 4

Extraction of Ge with Combined D2EHPA and M2EHPA

An organic phase consisting of, by volume, 2.3% D2EHPA, 2.7% M2EHPA and 95% kerosene was conditioned by method C-1. A portion of aqueous feed solution containing 0.63 g/L Ge and 75 g/L $H_2SO_4$ was contacted for 18 minutes in a mixer unit with the conditioned organic phase at a phase volume ratio of 1/1. Extraction of Germanium was 52%.

This result indicates that a mixture of M2EHPA and D2EHPA is capable of extracting Germanium under relatively low acid conditions, although at comparatively poor efficiency.

EXAMPLE 5

Extraction of Ge with Combined LIX 63, D2EHPA and M2EHPA

Portions of conditioned organic phase were prepared containing varying proportions of LIX 63, M2EHPA and D2EHPA, with kerosene diluent. The LIX 63 contained aromatic impurities. Portions of an aqueous feed solution containing 0.590 g/L Ge and 75 g/L $H_2SO_4$ were contacted with conditioned organic phase for 18 minutes in a mixer at an organic phase to aqueous phase volume ratio of 1/1. The results for Germanium extraction are given in Table 2.

TABLE 2

| Test No. | LIX 63 Vol. % | D2EHPA Vol. % | M2EHPA Vol. % | Kerosene Vol. % | Cond. Method | Ge Extr'n |
|---|---|---|---|---|---|---|
| 5(a) | 25 | 0.9 | 1.1 | 73 | C-1 | 84% |
| 5(b) | 25 | 2.3 | 2.7 | 70 | C-1 | 96% |
| 5(c) | 25 | 2.3 | 2.7 | 70 | C-2 | 97% |
| 5(d) | 25 | 2.3 | 2.7 | 70 | C-3 | 95% |
| 5(e) | 25 | 2 | 3 | 70 | C-1 | 99% |
| 5(f) | 25 | 2 | 3 | 70 | C-2 | 97% |
| 5(g) | 25 | 4.6 | 5.4 | 65 | C-2 | 96% |
| 5(h) | 25 | 6.9 | 8.1 | 60 | C-2 | 95% |
| 5(i) | 25 | 6 | 9 | 60 | C-2 | 97% |
| 5(j) | 20 | 9 | 11 | 60 | C-2 | 93% |

Example 5 shows that addition of M2EHPA to the LIX 63-D2EHPA extractant system provides highly efficient Ge extraction from relatively low-acid feed solution. Rapid phase separation was obtained with the three conditioning methods tested.

The conditioning method used had no significant effect on the overall efficiency of Ge extraction. It is noticeable that the ratio of the amount of LIX 63 (and thus by inference the amount of actual oxime) to the total amount of phosphoric acid esters present does appear to influence the efficiency of extraction of Ge. With 25 volume % LIX 63, optimum efficiency appears to be obtained at a LIX 63 to total phosphoric acid esters ratio in the region of 4–5 to 1, on a volume percent basis.

EXAMPLE 6

Effect of Acid Concentration in Aqueous Feed Solution on Extraction of Ge, As, Cd, Sb and In with Combined LIX 63, D2EHPA and M2EHPA Portions of aqueous feed solutions containing Ge, As, Cd, Sb, In and various concentrations of $H_2SO_4$ were contacted with unconditioned organic phase by shaking them together for 4 minutes in separatory funnels. The organic phase contained, by volume, 25% LIX 63, 2.3% D2EHPA, 2.7% M2EHPA and 70% kerosene. This ratio, of LIX 63 to total phosphate esters, is thus in the range in which optimum Ge extraction (Cf Ex 5) can be expected. The organic phase to aqueous phase volume ratio was 1/1. Phase separation was rapid. After phase separation, the extraction raffinates were analyzed. The concentrations of solutes in the organic phases were calcultated from the raffinate analyses. The results are summarized in Table 3.

TABLE 3

| Test No. | $H_2SO_4$ Conc. g/L | Solute | Aqueous Feed g/L | Raffinate Phase g/L | Organic Phase g/L | Extraction |
|---|---|---|---|---|---|---|
| 6(a) | 49.5 | Ge | 0.72 | 0.245 | 0.475 | 66% |
|  |  | As | 1.35 | 1.30 | 0.05 | 4% |
|  |  | Cd | 3.7 | 3.7 | 0.0 | 0% |
|  |  | Sb | 0.4 | 0.17 | 0.23 | 57% |
|  |  | In | 0.9 | 0.6 | 0.3 | 33% |
| 6(b) | 75 | Ge | 0.68 | 0.165 | 0.515 | 76% |
|  |  | As | 0.94 | 0.94 | 0.0 | 0% |
|  |  | Cd | 3.0 | 3.0 | 0.0 | 0% |
|  |  | Sb | 0.25 | 0.13 | 0.12 | 48% |
|  |  | In | 1.0 | 0.67 | 0.33 | 33% |
| 6(c) | 125 | Ge | 0.68 | 0.087 | 0.593 | 87% |
|  |  | As | 0.94 | 0.94 | 0.0 | 0% |
|  |  | Cd | 3.0 | 3.0 | 0.0 | 0% |
|  |  | Sb | 0.25 | 0.13 | 0.12 | 48% |
|  |  | In | 1.0 | 0.84 | 0.16 | 16% |
| 6(d) | 150 | Ge | 0.575 | 0.041 | 0.534 | 93% |
|  |  | As | 1.35 | 1.3 | 0.05 | 4% |
|  |  | Cd | 3.7 | 3.7 | 0.0 | 0% |
|  |  | Sb | 0.4 | 0.16 | 0.24 | 60% |
|  |  | In | 0.9 | 0.88 | 0.02 | 2% |

This Example shows that Ge extraction with combined LIX 63, D2EHPA and M2EHPA improves with increasing acid concentration in the aqueous feed solution. There is little or no extraction of As and no extraction of Cd. Sb extraction is significant at all feed acid concentrations. Extraction of In ranged from moderate at low aqueous phase acid concentration, to very low at higher acid concentrations. This relatively low In extraction is particularly surprising in view of the fact that D2EHPA by itself extracts In efficiently under the test conditions, as will be shown in Example 7. By comparing the extremely high In extraction efficiency obtained in Example 7 with the rather modest extraction in Example 6, it is evident that considerable suppression of In extraction can be achieved by the presence of LIX 63 in the organic phase. However it should also be noted, as can be seen from Example 8, that the level of In extraction depends on the total amount of phosphate esters present: increasing their amount increases In extraction, although the total extracted is still not as high as the reported capabilites of D2EHPA would suggest.

EXAMPLE 7

Extraction of In with D2EHPA

A portion of aqueous feed solution containing 0.950 g/L In and 146 g/L $H_2SO_4$ was contacted with an equal volume of unconditioned organic phase containing, by volume, 5% D2EHPA and 95% kerosene, by shaking for 4 minutes in a separatory funnel. Phase separation was slow. The extraction raffinate was found to contain 0.006 g/L In, corresponding to 0.944 g/L in the organic phase. The percent In extracted was thus greater than 99%.

Example 7 shows that D2EHPA by itself is a very efficient extractant for In under acid conditions, although phase separation is difficult. It is possible that addition of an alkanol modifier might assist in phase separation. It was later found that formation of stable emulsions could be prevented, without using a modifier, by conditioning the D2EHPA-kerosene organic phase by method C-1 or C-2 prior to extraction.

EXAMPLE 8

Effect of Concentration of Extractants on Extraction of Ge, As, Cd, Sb and In A portion of aqueous feed solution containing Ge, As, Cd, Sb, In and 125 g/L $H_2SO_4$ was contacted with an equal volume of unconditioned organic phase containing, by volume, 30% LIX 63, 4.6% D2EHPA, 5.4% M2EHPA and 60% kerosene, by shaking for 4 minutes in a separatory funnel. The results of the test are shown in Table 4.

TABLE 4

| $H_2SO_4$ Conc. g/L | Solute | Aqueous Feed g/L | Raffinate Phase g/L | Organic Phase g/L | Extraction |
|---|---|---|---|---|---|
| 125 | Ge | 0.68 | 0.047 | 0.633 | 93% |
| | As | 0.94 | 0.9 | 0.04 | 4% |
| | Cd | 3.0 | 3.0 | 0.0 | 0% |
| | Sb | 0.25 | 0.14 | 0.11 | 44% |
| | In | 1.0 | 0.21 | 0.79 | 79% |

The results in Example 8 are directly comparable with the results of Test 6(c) in Example 6, all the variables, except the organic phase composition, being the same in both tests. Example 8 shows some improvement in Ge extraction and increased As extraction. Cd is not extracted, as before. Sb extraction is slightly lower. Extraction of In increased greatly, possibly as a consequence of the total amount of phosphate esters beig doubled (i.e. 5% in Ex. 6, 10% in Ex. 8).

EXAMPLE 9

Selective Ge Extraction in the Presence of Zn, As, Cd, Sb, In, Cu and Fe (II)

To simulate a continuous multistage extraction, an aqueous feed solution containing, (in g/L), $H_2SO_4$ 75, Sn 40, Ge 0.68, As 0.94, Cd 3.0, Sb 0.25, In 1.0, Cu 0.011 and Fe (II) 34.7, was subjected to batch countercurrent 3-stage 5-cycle extraction as described in the Fifth Edition (1973) of "Chemical Engineers' Handbook", (McGraw-Hill Book Company) Section 15, page 15. The fresh organic phase was not conditioned, and contained, by volume, 25% LIX 63, 2.3% D2EHPA, 2.7% M2EHPA and 70% deodorized kerosene (obtained from J. T. Baker Chemical Co.). The organic to aqueous phase volume ratio was 1/1. Separatory funnels were used, with a shaking time of 4 minutes. The resulting organic phase contained, (in g/L), Ge 0.68, Cd 0.14, Sb 0.15 and In 0.90. Extraction of Sn, As, Cu and Fe was insignificant. This organic phase was then subjected to 9 successive contacts with fresh portions of the aqueous feed solution using a separatory funnel with a shaking time of 4 minutes for each contact, and an organic to aqueous phase volume ratio of 1/1. The 9 aqueous raffinates were analyzed and the composition of the organic phase after each contact was calculated. There was no significant transfer of Zn, As, Cu or Fe to the organic phase. The results for Ge, Cd, Sb and In are shown in Table 5.

TABLE 5

| | Raffinate Phase (g/L) | | | | Organic Phase (g/L) | | | |
|---|---|---|---|---|---|---|---|---|
| | Ge | Cd | Sb | In | Ge | Cd | Sb | In |
| Initial Organic Phase | — | — | — | — | 0.68 | 0.14 | 0.15 | 0.90 |
| After Contact No. 1 | 0.110 | 3.13 | 0.130 | 1.00 | 1.25 | 0.01 | 0.27 | 0.90 |
| After Contact No. 2 | 0.130 | 3.01 | 0.129 | 1.04 | 1.80 | 0 | 0.39 | 0.86 |
| After Contact No. 3 | 0.150 | 3.00 | 0.130 | 1.04 | 2.33 | 0 | 0.51 | 0.82 |
| After Contact No. 4 | 0.160 | 3.00 | 0.132 | 1.04 | 2.85 | 0 | 0.63 | 0.78 |
| After Contact No. 5 | 0.160 | 3.00 | 0.159 | 1.125 | 3.36 | 0 | 0.72 | 0.655 |
| After Contact No. 6 | 0.165 | 3.00 | 0.169 | 1.05 | 3.865 | 0 | 0.81 | 0.605 |
| After Contact No. 7 | 0.205 | 3.00 | 0.162 | 1.025 | 4.33 | 0 | 0.90 | 0.58 |
| After Contact No. 8 | 0.205 | 3.00 | 0.162 | 1.025 | 4.795 | 0 | 0.99 | 0.555 |
| After Contact No. 9 | 0.245 | 3.00 | 0.162 | 1.05 | 5.22 | 0 | 1.07 | 0.505 |

Example 9 indicates that the Ge loading capacity of the solvent is surprisingly high, and at 5.2 g/L Ge has still not reached its maximum capacity. The selectivity ratio for Ge extraction over Sb extraction is estimated to be between 3.2 and 5.5 under the conditions of this test. The Cd initially present in the organic phase was selectively and completely removed by contact with the aqueous feed solution. Sb continued to be extracted in nearly constant increments during each contact. The In content of the organic phase steadily declined during repeated contacts, indicating that it would be possible to minimize In co-extraction through careful selection of the organic to aqueous phase volume ratio and the number of countercurrent extraction stages in a continuously operating process.

EXAMPLE 10

Reduction of Cu and Ferric Iron Content in Aqueous Feed Solution

The organic phase of this invention was found to be capable of extracting a significant amount of Cu and ferric iron from acidic aqueous solutions if the concentrations of these species are sufficiently high. For feed solutions containing more than 0.03 g/L Cu and 0.13 g/L ferric iron, the following steps were taken. The feed solution was heated to 90° C., lead sulphide concentrate was added in the amount of 2 to 3 g for every gram of ferric iron present per liter of solution, and the mixture was agitated for 30 minutes. Then iron grit was added, 1.5 g per liter of solution, and the agitation was contained for a further 15 minutes. Upon cooling and separation of the solids, the $H_2SO_4$ concentration was adjusted as required to provide a feed solution suitable for Ge extraction. Using this procedure on a particular batch of solution, the Cu concentration was lowered from 0.105 g/L to 0.011 g/L and the ferric iron concentration was lowered from 4.2 g/L to virtually zero. The ferrous iron concentration increased from an initial value of 29.0 g/L to a final value of 34.7 g/L. Since As was also present in the solution, precautions were taken to deal with possible arsine generation, however no arsine was detected. Example 10 demonstrates an efficient and inexpensive means of lowering the copper and ferric iron concentrations in the aqueous feed to manageable levels prior to liquid-liquid extraction.

EXAMPLE 11

Scrubbinng of the Loaded Organic Phase

Following the extraction step, Cd and In are selectively removed from the loaded organic phase by scrubbing with an acidic aqueous solution.

In one case, the organic phase used for extraction contained, by volume, 30% LIX 63, 4.6% D2EHPA, 5.4% M2EHPA and 60% kerosene. After extraction, the solute concentrations in the loaded organic phase were: Ge 0.68 g/L, Cd 0.27 g/L, Sb 0.15 g/L and In 0.99 g/L. Scrubbing was carried out by shaking the loaded organic phase with an equal volume of dilute $H_2SO_4$ (50 g/L) for 4 minutes in a separatory funnel. Phase separation was rapid. The scrub raffinate was analyzed and the solute concentrations in the scrubbed organic phase were calculated to be: Ge 0.664 g/L, Cd 0.134 g/L, Sb 0.150 g/L and In 0.984 g/L. Scrubbing removed a substantial amount of Cd from the loaded orgaic phase, however, In removal was insignificant. No Sb was removed.

In a second case, the organic phase used for extraction contained, by volume, 25% LIX 63, 2.3% D2EHPA, 2.7% M2EHPA and 70% kerosene. After extraction, the solute concentrations in the loaded organic phase were: Ge 0.68 g/L, Cd 0.25 g/L, Sb 0.145 g/L and In 0.75 g/L. Scrubbing was carried out as described in the first case, except that the scrub solution consisted of return acid. Rapid phase separation was obtained. The solute concentrations in the scrubbed organic phase were found to be: Ge 0.674 g/L, Cd 0.060 g/L, Sb 0.141 g/L and In 0.32 g/L. Thus, a higher acid concentration in the scrub solution improved the Cd removal even further and gave, in addition, substantial In removal. Very little Sb was removed.

Example 11 shows that co-extracted Cd and In can be selectively scrubbed from the loaded organic phase with return acid.

EXAMPLE 12

Stripping Ge and Sb from the Scrubbed Organic Phase

Following the scrubbing step, Ge and Sb are stripped from the organic phase with an aqueous alkaline strip solution. Two-stage stripping was tested, at two temperatures, 20° C. and 55° C. Extraction of an aqueous feed solution was carried out with organic phase containing, by volume, 25% LIX 63, 2.3% D2EHPA, 2.7% M2EHPA and 70% kerosene. This resulting loaded organic phase was scrubbed with return acid. The organic phase, after scrubbing, contained: Ge 0.666 g/L, Sb 0.116 g/L and In 0.320 g/L.

In a stripping test at 20° C., a portion of the scrubbed organic phase was contacted with fresh aqueous strip solution containing 200 g/L NaOH, in a beaker agitated with a magnetic stirrer. The organic to aqueous phase volume ratio was 2/1. After 4 minutes of stirring, the resulting emulsion was transferred to a separatory funnel and the phases were allowed to disengage. The aqueous phase, or first strip liquor, was analyzed. The composition of the organic phase, or "first stripped organic phase", was calculated by difference. The first stripped organic phase was then subjected to a second stage of stripping, using fresh strip solution, under the same conditions as in the first stage. The resulting aqueous phase, or "second strip liquor", was analyzed, and the composition of the stripped organic phase, or "second stripped organic phase" was calculated. The results are shown in Table 6.

A second stripping test was carried out at 55° C., in a manner similar to the preceding test, but with the following differences in procedure. The organic phase and strip solution were separately preheated to 55° C., then contacted in a beaker on a stirring hot plate at 55° C., and finally the emulsion was transferred to a separatory funnel placed in a water bath at 55° C. for phase disengagement. The results are shown in Table 6.

TABLE 6

| Stripping Temp. | First Strip Liquor (g/L) | | | First Stripped Organic Phase (g/L) | | | % Stripped | | |
|---|---|---|---|---|---|---|---|---|---|
| | Ge | Sb | In | Ge | Sb | In | Ge | Sb | In |
| 20° C. | 1.100 | 0.202 | 0.180 | 0.116 | 0.015 | 0.230 | 83% | 87% | 28% |
| 55° C. | 1.150 | 0.199 | 0.031 | 0.091 | 0.017 | 0.304 | 86% | 85% | 5% |
| | Second Strip Liquor (g/L) | | | Second Stripped Organic Phase (g/L) | | | Total % Stripped | | |
| | Ge | Sb | In | Ge | Sb | In | Ge | Sb | In |
| 20° C. | 0.065 | 0.031 | 0.035 | 0.083 | 0.0 | 0.212 | 87% | 100% | 34% |
| 55° C. | 0.038 | 0.021 | 0.023 | 0.072 | 0.007 | 0.292 | 89% | 94% | 9% |

A white amorphous precipitate formed in the first stage of stripping at both temperatures. The amount formed at 55° C. was less than at 20° C. X-ray analysis showed that the precipitage consisted of $In(OH)_3$. Formation of troublesome amounts of the precipitate can be avoided by minimizing In co-extraction. Phase separation was rapid at both temperatures.

Example 12 shows that Ge and Sb can be efficiently stripped from the scrubbed organic phase by means of 2-stage alkaline stripping. In is partially stripped. Raising the stripping temperature from 20° C. to 55° C. has only a slight effect on Ge and Sb stripping. Substantially less In is stripped at 55° C. than at 20° C.

phases were calculated by difference. The Ge, Sb and In concentrations are given in Table 7.

TABLE 7

|  |  |  | Ge g/L | Sb g/L | In g/L |
|---|---|---|---|---|---|
| Extraction | In | Aqueous Feed | 0.590 | 0.195 | 0.940 |
|  |  | Regenerated Organic | 0.040 | 0.065 | 0.001 |
|  | Out | Extraction Raffinate | 0.030 | 0.018 | 0.925 |
|  |  | Loaded Organic | 1.720 | 0.596 | 0.046 |
| Scrubbing | In | Scrub Solution | 0 | 0 | 0 |
|  |  | Loaded Organic | 1.720 | 0.596 | 0.046 |
|  | Out | Scrub Raffinate | 0.025 | 0.038 | 0.043 |
|  |  | Scrubbed Organic | 1.695 | 0.558 | 0.003 |
| Stripping | In | Strip Solution | 0 | 0 | 0 |
|  |  | Scrubbed Organic | 1.695 | 0.558 | 0.003 |
|  | Out | Strip Liquor | 14.00* | 0.830* | 0.008* |
|  |  | Stripped Organic | 0.041 | 0.195 | 0.002 |
| Regeneration | In | Regenerant Solution | 0 | 0 | 0 |
|  |  | Stripped Organic | 0.041 | 0.195 | 0.002 |
|  | Out | Regeneration Raffinate | 0.001 | 0.130 | 0.001 |
|  |  | Regenerated Organic | 0.040 | 0.065 | 0.001 |

*These values were higher than expected, due to volume reduction of the aqueous phase.

EXAMPLE 13

Continuous Pilot-Scale Test

A 58-hour continuous test including extraction scrubbing, stripping and solvent regeneration was carried out using small pilot scale equipment. The total volume of aqueous feed treated was 105 liters. To prepare the aqueous feed, zinc plant leach solution was treated as described in Example 10 to lower the Cu and ferric iron content. The resulting aqueous feed has the following composition, expressed in g/L:

| $H_2SO_4$ | 110 | As | 0.545 | In | 0.940 |
|---|---|---|---|---|---|
| Zn | 85 | Cd | 0.940 | Cu | 0.006 |
| Ge |  | 0.590 | Sb | 0.195 | Fe 15 (as ferrous) |

The organic phase contained, by volume, 25% LIX 63, 2.1% D2EHPA, 2.9% M2EHPA and 70% kerosene. The organic phase was initially conditioned with return acid (method C-2). In the extraction step, the aqueous feed was contacted countercurrently with the organic phase recycled from solvent regeneration in 3 series-connected mixer/settlers, at an organic phase to aqueous phase volume ratio of 1/3. In the scrubbing step the loaded organic phase was contacted countercurrently with scrub solution in 3 series-connected mixer/settlers at an organic phase to aqueous phase volume ratio of 1/1. The scrub solution, comprising return acid fortified with technical grade 93% $H_2SO_4$, contained about 50 g/L Zn and 200 g/L $H_2SO_4$. In the stripping step, the scrubbed orgnaic phase was contacted countercurrently with strip solution in 3 series-connected mixer/settlers at an organic phase to aqueous phase volume ratio of 5/1. The strip solution contained 200 g/L NaOH. In the organic phase regeneration step, the stripped organic phase was contacted with regenerant solution in one mixer/settler at an organic to aqueous phase volume ratio of 1/1. The regenerant solution comprised return acid. Regenerated organic phase was recycled to the extraction step. In all the mixer/settlers the appropriate phase was recycled in order to maintain an organic phase to aqueous phase volume ratio of close to one in each mixer. The organic phase made about 5 cycles through the equipment during the course of the test. The raffinates, strip liquor and regenerated organic phase were analyzed. The solute concentrations in the loaded organic, scrubbed organic and stripped organic The recovery of Ge was excellent. About 95% of the Ge in the aqueous feed was extracted. The loss of Ge in scrubbing was very low. About 95% of the Ge in the loaded organic was stripped. The deportment of Sb was more complex. About 91% of the Sb entering the extraction step was co-extracted. About 6% of the Sb in the loaded orgaic reported to the scrub raffinate, 16% reported to the strip liquor, 44% precipitated in the stripping mixer/settlers as a white precipitate containing sodium antimonate, 23% reported to the regeneration raffinate, and 11% remained in the regenerated organic phase. The sodium antimonate precipitate did not impede phase separation. Less than 2% of the In in the aqueous feed was co-extracted. Of the extracted In, 93% was removed from the organic phase during scrubbing. There was no significant co-extraction of Zn, As, Cd, Cu and Fe.

Example 13 shows that an oranic phase including a LIX 63-D2EHPA-M2EHPA mixed extractant provides efficient and selective Ge extraction from solutions containing a variety of other metal ions. The selectivity with respect to Sb is lower than with other species; but is still more than adequate. The formation of an antimony-containing precipitate in the stripping stage is not a serious problem. The precipitate could be easily removed by settling, filtering or centrifuging or other known methods, or by a combination of these methods. Although scrubbing and organic phase regeneration were carried out at an organic phase to aqueous phase volume ratio of 1/1 for convenience during the test, this ratio could be raised to 5/1 in both of these steps.

EXAMPLE 14

Effect of Extractant Concentrations and Phase Volume Ratios on Ge Extraction Equilibria with Combined LIX 63, D2EHPA and M2EHPA A series of batch equilibration tests was carried out to examine Ge extraction with varying extractant concentrations and phase volume ratios, using combined LIX 63, D2EHPA and M2EHPA. In each test, fresh organic phase conditioned with a solution similar to that of method C-1, containing 100 g/L $H_2SO_4$ and 150 g/L $Na_2SO_4$, was contacted with fresh aqueous feed solution in a separatory funnel attached to a mechanical laboratory shaker. The experimental conditions and results are given in Tables 8, 9 and 10.

TABLE 8

| Aqueous feed: | 0.75 g/L Ge |
| | 80 g/L $H_2SO_4$ |
| Organic phase: | 6 Vol. % LIX 63 |
| | 1.9 Vol. % D2EHPA |
| | 1.1 Vol. % M2EHPA |
| | 91 Vol. % Exxsol D 80 |
| Contact time: | 4 hours |

| Test No. | Organic/Aqueous Volume Ratio | Ge in Raffinate Phase (g/L) | Ge in Organic Phase (g/L) | Ge Extr'n |
|---|---|---|---|---|
| 14(a) | 1/10 | 0.540 | 1.92 | 28% |
| 14(b) | 1/5 | 0.410 | 1.66 | 45% |
| 14(c) | 1/3 | 0.274 | 1.44 | 63% |
| 14(d) | 1/2 | 0.179 | 1.14 | 76% |
| 14(e) | 1/1 | 0.067 | 0.69 | 91% |
| 14(f) | 2/1 | 0.038 | 0.36 | 95% |
| 14(g) | 3/1 | 0.025 | 0.22 | 97% |
| 14(h) | 5/1 | 0.013 | 0.14 | 98% |

TABLE 9

| Aqueous feed: | 0.70 g/L Ge |
| | 80 g/L $H_2SO_4$ |
| Organic Phase: | 12 Vol. % LIX 63 |
| | 1.9 Vol. % D2EHPA |
| | 1.1 Vol. % M2EHPA |
| | 85 Vol. % Exxsol D 80 |
| Contact time: | 5 hours |

| Test No. | Organic/Aqueous Volume Ratio | Ge in Raffinate Phase (g/L) | Ge in Organic Phase (g/L) | Ge Extr'n |
|---|---|---|---|---|
| 14(i) | 1/10 | 0.423 | 3.08 | 40% |
| 14(j) | 1/5 | 0.234 | 2.52 | 67% |
| 14(k) | 1/3 | 0.144 | 1.85 | 79% |
| 14(l) | 1/2 | 0.086 | 1.35 | 88% |
| 14(m) | 1/1 | 0.043 | 0.72 | 94% |
| 14(n) | 2/1 | 0.021 | 0.37 | 97% |
| 14(o) | 3/1 | 0.013 | 0.25 | 98% |

TABLE 10

| Aqueous feed: | 0.73 g/L Ge |
| | 80 g/L $H_2SO_4$ |
| Organic phase: | 25 Vol. % LIX 63 |
| | 3.2 Vol. % D2EHPA |
| | 1.8 Vol. % M2EHPA |
| | 70 Vol. % Exxsol D80 |
| Contact time: | 5 hours |

| Test No. | Organic/Aqueous Volume Ratio | Ge in Raffinate Phase (g/L) | Ge in Organic Phase (g/L) | Ge Extr'n |
|---|---|---|---|---|
| 14(p) | 1/20 | 0.425 | 6.80 | 42% |
| 14(q) | 1/10 | 0.250 | 5.10 | 66% |
| 14(r) | 1/5 | 0.105 | 3.40 | 86% |
| 14(s) | 1/3 | 0.063 | 2.30 | 91% |
| 14(t) | 1/2 | 0.043 | 1.50 | 94% |
| 14(u) | 1/1 | 0.020 | 0.74 | 97% |
| 14(v) | 2/1 | 0.010 | 0.37 | 99% |

Although these results represent equilibrium, or near-equilibrium, conditions, and do not provide information on the rate of extraction, certain conclusions may be drawn. Even at the lowest extractant concentrations studied (Table 8), substantially complete Ge extraction may be attained with a sufficiently large number of extraction stages or with a sufficiently high organic to aqueous phase volume or with a combination of the two. The extent of Ge extraction increases with increasing extractant concentrations. As expected, by increasing the extractant concentrations, the organic to aqueous phase volume ratio can be lowered. For example, to obtain an equilibrium extraction of 94%, the ratio shifts from 2/1 (Table 8), through 1/1 (Table 9), to 1/2 (Table 10).

EXAMPLE 15

Germanium Extraction Rates with LIX 63 Alone and with Combined LIX 63, D2EHPA and M2EHPA From the prior art, and as shown in Example 1, it is known that LIX 63 is capable of extracting Ge from relatively low-acid solutions, but with rather poor efficiency. In Example 3 it is shown that a combination of LIX 63 and D2EHPA gives more efficient Ge extraction than LIX 63 alone, an unexpected result in view of the fact that D2EHPA by itself does not extract Ge under the same conditions. This latter fact is demonstrated by Example 2 and by the prior art. In Example 5 and other Examples it is shown that a combination of LIX 63, D2EHPA and M2EHPA provides even higher Ge extraction efficiency than combined LIX 63 and D2EHPA under relatively low-acid conditions.

In the present Example, two tests were carried out to verify the superior performance of combined LIX 63, D2EHPA and M2EHPA in comparison with LIX 63 alone, with respect to Ge extraction kinetics and equilibria under relatively low-acid conditions. In each test, 1.5 L of fresh aqueous feed and 1.5 L of fresh organic phase (conditioned as in Example 14) were intensively contacted by stirring with a turbine mixer at 630 rpm. At predetermined time intervals, samples of the emulsion were withdrawn for phase separation and analysis. The results are given in Table 11. In Test 15(a), the aqueous feed contained 0.71 g Ge and 80 g/L $H_2SO_4$, while the organic phase comprised 12 vol. % LIX 63 and 88 vol. % Exxsol D 80. For Test 15(b), the aqueous feed contained 0.74 g/L Ge and 80 g/L $H_2SO_4$, with an organic phase comprising 12 vol. % LIX 63, 1.9 vol. % D2EHPA, 1.1vol. % M2EHPA and 85 vol. % Exxsol D 80.

TABLE 11

| Time (minutes) | Test No. 15(a) Ge Extraction | Test No. 15(b) Ge Extraction |
|---|---|---|
| 0.5 | * | 22% |
| 1 | 4% | 31% |
| 2 | 11% | 46% |
| 5 | 20% | 73% |
| 10 | 30% | 87% |
| 15 | 31% | 92% |
| 20 | * | 93% |
| 30 | 35% | * |
| 60 | 35% | * |

*not measured.

These results clearly confirm the superiority of the combined extractants over LIX 63 alone. The initial extraction rate with the combined extractants is at least five to ten times higher than with LIX 63 alone. Although equilibrium or near-equilibrium was reached at about the same time in both systems (after about 15 to 20 minutes of contact), the combined extractants gave an equilibrium Ge extraction about three times higher than with LIX 63 alone.

NOTE

In the preceding discussion, and in the following claims, terms are used to describe various esters of orthophosphoric acid, $H_3PO_4$. Whilst proper schematic names for these compounds, according to the I.U.P.A.C. Rules, exist they are not used in commercial practice. To avoid any doubt as to the nomenclature used herein, the following definitions are provided; in each of them the group R is an alkyl group, for example the 2-ethylhexyl group referred to extensively herein.

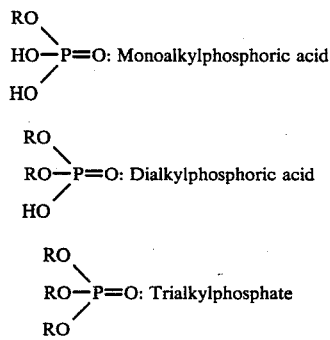

We claim:

1. In a process for the separation of germanium from an aqueous sulphuric acid containing feed solution containing, together with from about 50 to about 150 g/liter of acid, germanium and other dissolved metal elements including at least one metal chosen from the group consisting of zinc, arsenic, cadmium, antimony, indium, copper, and ferrous iron, which process utilizes multistage countercurrent liquid-liquid extraction, the improvement comprising using as the organic phase a solution in a hydrocarbon diluent of 5,8-diethyl-7-hydroxy-6-dodecanone oxime together with a phosphoric acid chosen from either di-2-ethyl-hexylphosphoric acid or a mixture of mono- and di-2-ethylhexylphosphoric acids.

2. A process according to claim 1, wherein the phosphoric acid is di-2-ethylhexylphosphoric acid (D2EHPA).

3. A process according to claim 2 wherein the organic phase the ratio in parts by volume of oxime to D2EHPA ranges from about 7:1 to about 7:5.

4. A process according to claim 2 wherein the organic phase the ratio in parts by volume of oxime to D2EHPA ranges from about 17:4 to about 14:5.

5. A process according to claim 1, wherein the phosphoric acid is a mixture of mono-2-ethylhexylphosphoric acid (M2EHPA) and di-2-ethylhexylphosphoric acid (D2EHPA).

6. A process according to claim 5, wherein the organic phase the volume ratio of oxime to M2EHPA and D2EHPA combined is from about 7:1 to about 7:10.

7. A process according to claim 5, wherein the organic phase the volume ratio of oxime to M2EHPA and D2EHPA combined is from about 17:4 to about 7:5, and wherein the volume ratio of D2EHPA to M2EHPA is from about 7:4 to about 2:3.

8. A process according to claim 7, wherein the organic phase contains from about 7% by volume to about 35% by volume of oxime combined with either D2EHPA, or a mixture of M2EHPA and D2EHPA, and from about 93% by volume to about 65% by volume of hydrocarbon diluent.

* * * * *